3,228,946
NEW AMINOPYRAZOLES

Paul Schmidt, Therwil, and Kurt Eichenberger and Max Wilhelm, Basel, Switzerland, assignors to Ciba Corporation, New York, N.Y., a corporation of Delaware
No Drawing. Filed Nov. 21, 1962, Ser. No. 239,358
Claims priority, application Switzerland, Jan. 23, 1962, 786/62

The portion of the term of the patent subsequent to February 16, 1982, has been disclaimed 18 Claims. (Cl. 260—293)

This invention provides 2-R-3-aminopyrazoles which which are substituted in the 5-position by a pyridyl-(3) radical, their N-acyl derivatives, quaternary ammonium compounds of these compounds and the salts thereof.

The substituent R in the 2-position is an unsubstituted or substituted hydrocarbon radical, saturated heterocyclic or heterocyclic-aliphatic radical.

Hydrocarbon radicals in 2-position are, for example, saturated or unsaturated aliphatic, alicyclic, alicyclic aliphatic, araliphatic or aromatic hydrocarbon radicals, such as lower straight-chain or branched alkyl or alkenyl radicals, for example methyl, ethyl, propyl, isopropyl radicals and straight-chain or branched butyl, pentyl, hexyl or heptyl radicals linked in any position, allyl, or methallyl radicals, cycloalkyl or cycloalkenyl radicals, such as cyclopentyl, cyclohexyl, cycloheptyl, cyclopentenyl, cyclohexenyl radicals, cycloalkyl alkyl or cycloalkenyl alkyl radicals, such as cyclopentyl or cyclohexenyl methyl, ethyl or propyl radicals, aralkyl or aralkenyl radicals, such as phenylmethyl, phenylethyl, phenylvinyl or phenylpropyl radicals, or aryl, more particularly phenyl radicals. Heterocyclic or heterocyclic-aliphatic radicals are, in particular, mononuclear radicals, such as pyridyl radicals, or piperidyl, e.g., N-alkyl-piperidyl-(4) radicals.

As substituents of the said aliphatic radicals in 2-position there may be mentioned in particular free or substituted hydroxyl, mercapto or amino groups in which the substituents are preferably of an aliphatic nature, for example lower alkoxy, alkylmercapto or mono- or dialkylamino or mono- or dicycloalkyl-amino groups, alkylene-, oxaalkylene-, azaalkylene- or thiaalkylene-amino groups, such as methyl-, ethyl-, propyl-, butyl-, pentyl-, or hexyloxy or mercapto groups, methyl-, dimethyl-, ethyl-, diethyl-, propyl-, dipropyl-, N-methyl-N-propyl-, N-methyl-N-cyclopentyl-, butyl-, dibutyl-amino groups, pyrrolidino, piperidino, morpholino or piperazino groups, for example the piperazino, N-methylpiperazino or N-hydroxyethyl-piperazino group.

Other substituents which are possible as regards the aliphatic radicals are halogen atoms, such as chlorine or bromine.

The alicyclic radicals in 2-position may carry in particular lower alkyl radicals.

Aromatic or heterocyclic radicals in 2-position may have in particular halogen atoms or the above-indicated alkyl or alkoxy groups, while in the alicyclic-aliphatic, araliphatic or heterocyclic-aliphatic radicals both parts may be substituted as stated.

The new compounds may be further substituted in the nuclei. In this connection, for example, substitution in 4-position may be mentioned. Substituents are, for example: lower alkyl radicals, phenyl radicals, which may be substituted, if required, by lower alkyl or alkoxy groups or halogen atoms. Lower alkyl or alkoxy radicals are, in particular, methyl, ethyl, propyl, isopropyl or straight-chain or branched butyl, pentyl, hexyl or heptyl radicals linked in any position or the corresponding alkoxy groups and halogen atoms, especially fluorine, chlorine, bromine or the pseudohalogen trifluoromethyl.

N-acyl compounds such as mono- or di-N-acyl compounds are in particular those which are derived from carbonic or its derivatives or from lower aliphatic, alicyclic, aromatic or heterocyclic acids. There may be mentioned, for example carbonic acid or its derivatives, such as carbamic acids, for example, N-alkyl-carbamic acids or lower fatty acids, such as acetic acid, propionic acid, butyric acid, pivalic acid or their halo-, hydroxy or amino substitution products; cycloalkane-carboxylic acids, such as cyclopentyl- or cyclohexyl-carboxylic acid; cycloalkylalkane-carboxylic acids, for example cyclopentylpropionic acid; benzoic acids, which may be substituted if required by lower alkyl or alkoxy groups or halogen atoms; or pyridinecarboxylic acids, for example nicotinic or isonicotinic acid.

Quaternary ammonium derivatives of the new compounds are, in particular, lower alkylammonium or benzylammonium compounds, which latter may be substituted in the nucleus if required.

The new compounds have an anti-inflammatory, antipyretic and anti-allergic action, those carrying an N-alkyl-piperidyl-4-radical also a hypotensive or coronary-dilating action, and, accordingly, can be employed pharmacologically on animals or as medicaments, for example in the treatment of inflammatory or allergic processes or as coronary dilating agents respectively. They are also valuable intermediate products for the preparation of other compounds which can be employed in particular as pharmaceutics.

Particularly valuable are compounds of the formula

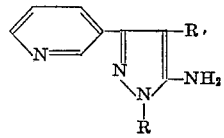

their N-acyl derivatives and salts thereof, in which R represents a lower alkyl, hydroxyalkyl, aminoalkyl, mono- or di-lower-alkylamino-alkyl, alkyleneimino-alkyl, azaalkylene-imino-alkyl, oxaalkylene-amino-alkyl or cycloalkyl radical, for example one of the above-mentioned radicals, or a phenyl radical which may be substituted, if required, by lower alkyl or alkoxy groups or halogen atoms, or a pyridyl radical, for instance the pyridyl-2-radical, or an N-alkyl-piperidyl radical, such as the N-methyl-piperidyl-(4) radical, and R' represents hydrogen or a lower alkyl radical.

Particularly to be mentioned in this connection are compounds of the formula

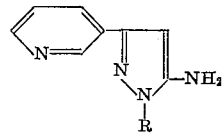

and their salts, in which R signifies a lower alkyl radical, such as methyl, ethyl, propyl, butyl or pentyl, but in particular a propyl, butyl, pentyl or hexyl radical which is branched or not linked in 1-position, a cycloalkyl radical, such as cyclopentyl or cyclohexyl, a phenyl, halophenyl, lower alkoxyphenyl or lower alkylphenyl radical or a pyridyl radical, such as the pyridyl-(2) radical, or an N-alkyl-piperidyl radical, such as the N-methyl-piperidyl-(4) radical, and their N-acyl, such as N-acetyl or alkyl carbamoyl, derivatives, and the salts of these compounds. Mention should be made primarily of 2-sec. butyl-3-amino-5-pyridyl-(3)-pyrazole and its salts, and its N-acetyl derivative.

The new compounds are obtained by reacting pyridyl-(3)-ketones having in the α-position with respect to the carbonyl group at least one hydrogen atom and a nitrile group, such as a 3-(α-cyanoalkanoyl)-pyridine, with 2-R-hydrazines, in which R has the above-indicated significance.

The reaction is carried out in manner known per se, advantageously in the presence of diluents and, if required, at elevated temperature and/or in the presence of condensing agents, for example strong acids, such as hydrochloric acid, arylsulfonic acids and similar acids.

The aminopyrazoles obtained can be N-acylated in conventional manner, for example with reactive derivatives, such as halides or anhydrides, of the acids mentioned at the beginning, for example, also isocyanates, preferably in the presence of the conventional acid-binding condensing agents. Depending on the reaction conditions, for example, reaction temperature on the one hand, and elevated temperature and excess of acylating agent, on the other hand, one or two acyl radicals can be introduced.

4-unsubstituted compounds obtained can readily be halogenated in 4-position, for example by treatment with chlorinating or brominating agents, such as, in particular, elemental chlorine or bromine, or compounds giving off chlorine or bromine. Tertiary amines obtained can be quaternised in manner known per se, for example by reaction with reactive esters of lower alkanols or benzyl alcohols, such as their halides, sulfonates or sulfates.

The invention also relates to those embodiments of the process in which a start is made from a compound which can be obtained at any stage as an intermediate product and the missing steps are carried out or the process is interrupted at any stage, or in which a starting material is produced under the reaction conditions or employed in the form of a salt or quaternary ammonium derivative.

The said reactions are carried out in conventional manner in the presence or absence of diluents, condensing and/or catalytic agents, at reduced, ordinary or elevated temperature, if required in a closed vessel.

The pyridoyl - (3) - acetonitriles employed as starting materials and which may be monosubstituted and their salts are new. They likewise form an object of the invention. These compounds are obtained when pyridine-3-carboxylic acid esters, such as an alkyl, for example the ethyl, ester, is reacted with a possibly monosubstituted acetonitrile.

The other starting materials are known or can likewise be obtained by known methods.

Depending on the reaction conditions and starting materials, the new compounds are obtained in free form or in the form of their salts. The salts of the new compounds can be transformed into the free compounds in manner known per se, for example, acid addition salts by reaction with a basic agent. On the other hand, if required, free bases which are obtained can form salts with inorganic or organic acids. To produce acid addition salts, therapeutically useable acids are employed in particular, for example hydrohalic acids, for example, hydrochloric acid or hydrobromic acid, perchloric acid, nitric acid or thiocyanic acid, sulfuric or phosphoric acids, or organic acids, such as formic acid, acetic acid, propionic acid, glycolic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicyclic acid, 4-aminosalicylic acid, 2-phenoxybenzoic acid, 2-acetoxybenzoic acid, methanesulfonic acid, ethanesulfonic acid, hydroxyethanesulfonic acid, benzenesulfonic acid, p-toluenesulfonic acid, naphthalenesulfonic acid or sulfanilic acid, or methionine, tryptophan, lysine or arginine. At the same time, the salts may be mono- or polysalts.

Quaternary ammonium salts may also be converted into the ammonium hydroxides, for example, by the action of freshly precipitated silver oxide on the ammonium halides, or the action of barium hydroxide solution on the ammonium sulfates, or by using basic ion exchangers, and from the said ammonium hydroxides other ammonium salts can be obtained by reaction with acids, for instance those mentioned above. The said exchange may also take place direct, using suitable ion exchangers.

If the new compounds contain asymmetrical carbon atoms, they may be in the form of racemates or racemate mixtures, which can be separated in conventional manner or decomposed into the antipodes.

The new compounds are intended to be used as medicaments in the form of pharmaceutical preparations containing these compounds together with pharmaceutical, organic or inorganic, solid or liquid carriers suitable for enteral, for example, oral, or parenteral administration. For making the carriers there are used substances which do not react with the new compounds, such as, for example, water, gelatine, lactose, starch, magnesium stearate, talc, vegetable oils, benzyl alcohols, gums, polyalkylene glycols, cholesterol or other known known carriers for medicaments. The pharmaceutical preparations may be in the form, for example, of tablets, dragees, capsules or in liquid form as solutions, suspensions or emulsions. If desired, they are sterilised and/or contain auxiliary substances, such as preserving, stabilising wetting or emulsifying agents, salts for changing the osmotic pressure or buffers. They may also contain other therapeutically valuable substances. The new compounds may also be employed in veterinary medicine, for example in one of the abovementioned forms.

The invention is described in greater detail in the following examples. The temperatures are given in degrees centigrade.

*Example 1*

14.6 grams of nicotinoyl acetonitrile are boiled with 12.2 grams of benzyl hydrozine in 150 cc. of absolute alcohol for 10 hours under reflux. The alcoholic solution is concentrated after purification with carbon until crystallisation commences, a little ether is added and the crystals are filtered off with suction. In this way, 2-benzyl-3-amino-5-pyridyl-(3)-pyrazole of the formula

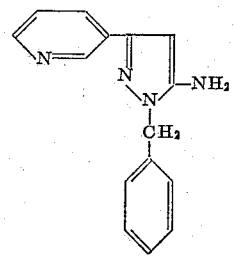

is obtained, the melting point of which is 131–132° C.

*Example 2*

14.6 grams of nicotinoyl acetonitrile are boiled with 10 grams of 74% isopropyl hydrazine in 150 cc. of absolute alcohol for 10 hours under reflux. The alcoholic reaction solution is evaporated to dryness after purification with carbon and the residue is recrystallized from methanol-water. In this way, 2-isopropyl - 3 - amino-5-pyridyl-(3)-pyrazole of the formula

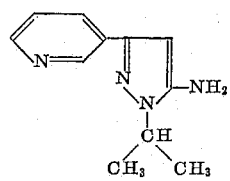

is obtained, the melting point of which is 118–120° C.

Example 3

14.6 grams of nicotinoyl acetonitrile are boiled with 9.6 grams of sec.-butyl hydrazine in 150 cc. of absolute alcohol for 10 hours under reflux. The alcoholic reaction solution is concentrated after purification with carbon until crystallisation commences and the crystals are filtered off with suction. In this way, 2-sec.-butyl-3-amino-5-pyridyl-(3)-pyrazole of the formula

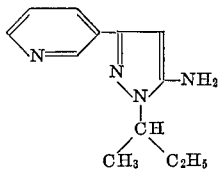

is obtained, the melting point of which is 122–123° C.

Example 4

14.6 grams of nicotinoyl acetonitrile are boiled with 7.6 grams of β-hydroxyethyl hydrazine in 150 cc. of absolute alcohol for 10 hours under reflux. The alcoholic reaction solution is concentrated after purification with carbon util crystallisation commences and the crystals are filtered off with suction. In this way, 2-(β-hydroxyethyl)-3-amino-5-pyridyl-(3)-pyrazole of the formula

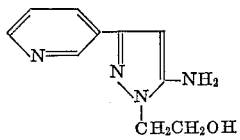

is obtained, the melting point of which is 160–161° C.

The nicotinoyl acetonitrile employed as starting product can be prepared as follows:

500 cc. of absolute alcohol are added slowly drop by drop to 46 grams of sodium in 1.5 litres of boiling toluene. After the sodium has dissolved, distilling off is carried out until the boiling point rises to 91° C. The reaction solution is then allowed to cool to 90° C., 200 grams of ethyl nicotinate and 120 grams of acetonitrile are added and the mixture is boiled for 7 hours under reflux. After cooling, water is added and the layer of toluene is separated. After adding 252 cc. of 7.04 N-hydrochloric acid to the aqueous phase and after cooling strongly, nicotinoyl acetonitrile of the formula

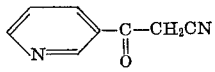

and having a melting point of 76–77° C. is precipitated.

Example 5

8 cc. of acetic anhydride are added to 10.8 grams of 2-secondary butyl - 3 - amino-5-pyridyl-(3)-pyrazole and the whole is allowed to stand for 26 hours at room temperature. To the partially crystalline reaction mixture there is added saturated sodium bicarbonate solution; the mixture is extracted with ether. The ethereal solution is dried and strongly concentrated. After cooling, the precipitated crystals are filtered with suction and then recrystallized from ether. There is obtained 2-secondary butyl-3-acetamino-5-pyridyl-(3)-pyrazole of the formula

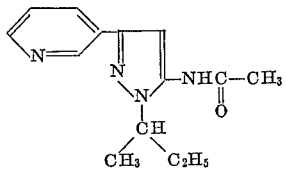

melting at 85–88° C.

Example 6

7.3 grams of nicotinoyl-acetonitrile are boiled under reflux with 6.55 grams of β-diethylaminoethyl-hydrazine in 75 cc. of ethanol for 10 hours. The alcoholic reaction solution is then evaporated to dryness, the residue dissolved in 2 N-hydrochloric acid and extracted with ether. The acidic aqueous solution is rendered alkaline with concentrated sodium hydroxide solution and extracted with chloroform. The chloroform solution is dried and evaporated. The resulting residue is boiled with ether, any undissolved material is filtered off, and the filtrate concentrated, 2-(β-diethylamino-ethyl)-3-amino-5-pyridyl-(3)-pyrazole of the formula

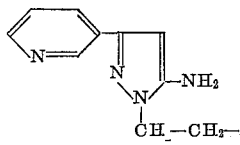

precipitating; M.P. 84–86° C. After being recrystallized from ether the product melts at 87–89° C.

23.9 cc. of 0.8 N-alcoholic hydrochloric acid are added to 4.95 grams of the above base dissolved in 10 cc. of absolute ethanol. The reaction solution is then strongly concentrated, a little ether is added, whereupon the monohydrochloride of 2-(β-diethylaminoethyl) - 3 - amino-5-pyridyl-(3)-pyrazole melting at 159–161° C. precipitates.

Example 7

A solution of 1.15 grams of sodium in 20 cc. of absolute ethanol is added to a solution of 10.1 grams of N-methyl-piperidyl-(4)-hydrazine-dihydrochloride in 260 cc. of ethanol of 98% strength. The precipitated sodium chloride is filtered off, the filtrate is added to a solution of 7.3 grams of nicotinoyl-acetonitrile in 50 cc. of absolute alcohol and the mixture is boiled under reflux for 10 hours. The alcoholic reaction solution is then evaporated to dryness, the residue dissolved in water and extracted with ether. The aqueous solution is rendered strongly alkaline with sodium hydroxide solution and extracted with chloroform. The chloroform solution is evaporated and the residue recrystallized from ethanol to yield 2-[N-methyl-piperidyl-(4)]-3-amino-5-pyridyl-(3)-pyrazole of the formula

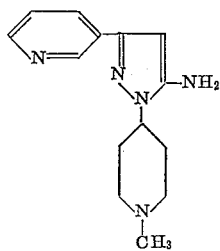

melting at 177–178° C.

3.3 grams of the above base dissolved in 20 cc. of ethanol are treated with 32.1 cc. of 0.8 N-alcoholic hydrochloric acid, whereupon the dihydrochloride of 2-[N-methyl - piperidyl-(4)]-3 - amino-5-pyridyl-(3)-pyrazole melting at 271–273° C. precipitates.

Example 8

10.8 grams of 2-secondary butyl-3-amino-5-pyridyl-(3)-pyrazole are heated at 100° C. for 6 hours with 60 cc. of acetic anhydride. The mixture is then evaporated under reduced pressure, the residue dissolved in ether, and the solution extracted by shaking with a saturated sodium bicarbonate solution. The ethereal solution is dried and evaporated. The residue is subjected to fractional distillation under a high vacuum to obtain the N-diacetyl-2-secondary butyl-3-amino-5-pyridyl-(3)-pyrazole boiling at 165–169° C. under a pressure of 0.08 mm. of Hg.

What is claimed is:
1. A compound of the formula

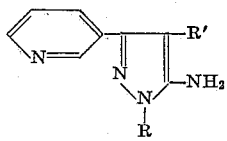

in which R represents a member selected from the group consisting of lower alkyl, lower alkenyl, hydroxy-lower alkyl, amino-lower alkyl, mono-lower alkylamino-lower alkyl, di-lower alkylamino-lower alkyl, pyrrolidino-lower alkyl, piperidino-lower alkyl, morpholino-lower alkyl, piperazino-lower alkyl, N-lower alkyl-piperazino-lower alkyl and N-hydroxy-lower alkyl-piperazino-lower alkyl, lower cycloalkyl, lower cycloalkenyl, lower cycloalkyl-lower alkyl, lower cycloalkenyl-lower alkyl, phenyl, lower alkyl-phenyl, lower alkoxy-phenyl, halogenophenyl, phenyl-lower alkyl, lower alkyl-phenyl-lower alkyl, lower alkoxy-phenyl-lower alkyl, halogeno-phenyl-lower alkyl phenyl-lower alkenyl, lower alkyl-phenyl-lower alkenyl, lower alkoxy-phenyl-lower alkenyl, halogeno-phenyl-lower alkenyl, pyridyl, piperidyl and N-lower alkyl-piperidyl, and R' represents a member selected from the group consisting of hydrogen, phenyl, lower alkyl-phenyl, lower alkoxy-phenyl and halogeno-phenyl.

2. A member selected from the group consisting of carbamoyl-, N-lower alkyl carbamoyl-, lower alkanoyl-, halogeno-lower alkanoyl-, hydroxy-lower alkanoyl-, amino-lower alkanoyl-, benzoyl-, lower alkyl-benzoyl-, lower alkoxy-benzoyl-, halogeno-benzoyl- and pyridoyl-derivatives of the compounds of claim 1.

3. A therapeutically useful acid addition salt of a compound claimed in claim 1.

4. A therapeutically useful acid addition salt of a compound claimed in claim 2.

5. A member selected from the group consisting of quaternary lower alkyl- and benzyl-ammonium derivatives of the compounds claimed in claim 1.

6. A compound of the formula

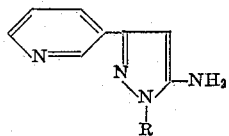

wherein R stands for N-lower alkyl-piperidyl.

7. A therapeutically useful acid addition salt of the compound claimed in claim 6.

8. A compound of the formula

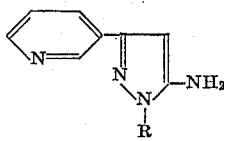

in which R represents lower alkyl.

9. A salt of a compound claimed in claim 8.

10. 2-Secondary butyl-3-amino-5-pyridyl-(3)-pyrazole of the formula

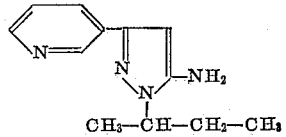

11. 2-Isopropyl-3-amino-5-pyridyl-(3)-pyrazole of the formula

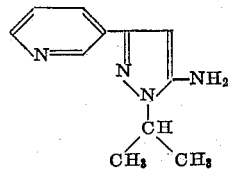

12. β-Hydroxyethyl-3-amino-5-pyridyl-(3)-pyrazole of the formula

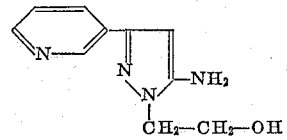

13. 2-Benzyl-3-amino-5-pyridyl - (3) - pyrazole of the formula

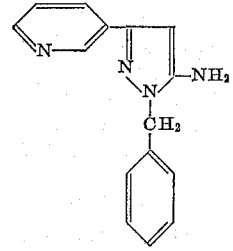

14. A member selected from the group consisting of 2-secondary butyl-3-acetamino-5-pyridyl-(3)-pyrazole of the formula

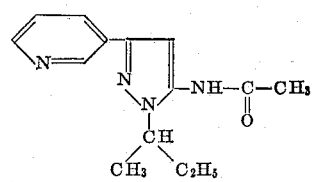

and its therapeutically useful acid addition salts.

15. A member selected from the group consisting of 2-(β-diethylamino-ethyl)-3-amino - 5 - pyridyl-(3)-pyrazole of the formula

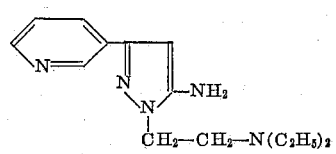

and its therapeutically useful acid addition salts.

16. N-diacetyl-2-secondary butyl - 3 - amino-5-pyridyl-(3)-pyrazole.

17. 2-[N-methyl-piperidyl-(4)]-3-amino - 5 - pyridyl-(3)-pyrazole of the formula

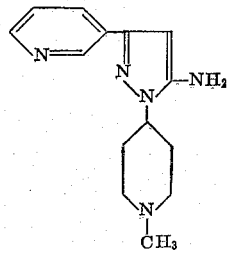

18. Pyridoyl-(3)-acetonitrile.

References Cited by the Examiner
UNITED STATES PATENTS
| | | | |
|---|---|---|---|
| 2,833,779 | 5/1958 | Fields et al. | 260—296 |
| 3,041,342 | 6/1962 | Jucker et al. | 260—293 |
| 3,041,343 | 6/1962 | Jucker et al. | 260—294.9 |

OTHER REFERENCES
Bernthsen et al., "Organic Chemistry," 1941 Edition, pages 681–9 (Blackie).

WALTER A. MODANCE, *Primary Examiner.*

IRVING MARCUS, *Examiner.*